United States Patent [19]

Weaver

[11] Patent Number: 4,474,359
[45] Date of Patent: Oct. 2, 1984

[54] HEAVY DUTY LIFT BED TRAILER
[75] Inventor: Leslie A. Weaver, Monticello, Ind.
[73] Assignee: Eugene A. Le Boeuf, Hobart, Ind.
[21] Appl. No.: 315,437
[22] Filed: Oct. 27, 1981

Related U.S. Application Data
[63] Continuation-in-part of Ser. No. 111,921, Jan. 14, 1980, abandoned.

[51] Int. Cl.³ .............................. B60P 1/20; B60P 1/64
[52] U.S. Cl. ................................... 254/8 C; 414/495; 414/498
[58] Field of Search .............. 414/495, 498; 187/7.47; 254/8 R, 8 B, 8 C, 10 R, 10 B, 10 C, 45, 49, 50, 124

[56] References Cited
U.S. PATENT DOCUMENTS

| | | |
|---|---|---|
| 2,027,421 | 1/1936 | Eisenberg . |
| 2,251,839 | 8/1941 | Dondlinger . |
| 2,395,640 | 2/1946 | Pearson . |
| 2,596,838 | 5/1952 | Carver et al. . |
| 2,670,866 | 2/1954 | Glesby . |
| 2,676,783 | 4/1954 | Rogers . |
| 2,847,137 | 8/1958 | Stringfellow . |
| 3,112,836 | 12/1963 | Back . |
| 3,119,503 | 1/1964 | Herpich et al. . |
| 3,362,552 | 1/1968 | Thiele . |
| 3,719,299 | 3/1973 | Oehler . |
| 3,737,061 | 6/1973 | Glumac . |
| 3,784,162 | 1/1974 | Channell et al. . |
| 3,809,268 | 5/1974 | Lutz . |
| 3,819,076 | 6/1974 | Oehler . |
| 4,050,707 | 9/1977 | Glumac . |
| 4,050,709 | 9/1977 | LeBoeuf . |
| 4,060,145 | 11/1977 | Kingman et al. . |

Primary Examiner—Robert G. Sheridan
Attorney, Agent, or Firm—Leydig, Voit, Osann, Mayer & Holt, Ltd.

[57] ABSTRACT

A heavy duty lift bed trailer adapted for in-plant or highway use to transport high tonnage loads on pallet frame units which can be picked up or dropped off quickly without the need for additional equipment or personnel. The trailer may be coupled to a tractor vehicle by means of a fixed gooseneck built to a conventional fifth wheel height. It includes a plurality of centrally located hinge panels pivotally connected between said main frame and said lift bed for constraining the latter to move in parallel relation to said frame between a lowered loading position and a raised transport position; an improved motion arresting locking mechanism securing the lift bed for transport; a heavy duty suspension adapted to equalize the load on each axle; and is capable of handling eccentric as well as laterally centered loads.

11 Claims, 20 Drawing Figures fig. 4.   fig. 5.

HEAVY DUTY LIFT BED TRAILER

DESCRIPTION OF THE INVENTION

This application is a continuation-in-part of my earlier copending application Ser. No. 111,921, filed Jan. 14, 1980 and now abandoned.

The present invention relates to heavy duty lift bed trailers adapted for transporting high tonnage loads on pallet frame units capable of being picked up or dropped off quickly without waiting for additional handling equipment or personnel. The combined use of lift bed trailer and detachable pallet frame units thus serves to maximize the availability of the trailer for transport rather than storage or demurrage. The invention represents an improvement over those disclosed in prior U.S. Pat. Nos. 4,061,353 and 4,060,145 issued on the applications of Kingman et al.

One object of the invention is to provide a heavy duty lift bed trailer adapted to be coupled to a tractor vehicle and capable of handling and transporting loads up to 60 tons mounted on pallet frame units either symmetrically or eccentrically with respect to the fore and aft axial plane of the trailer.

Another object is to provide a heavy duty lift bed trailer of the character set forth above adapted to be coupled to a tractor by means of a fixed gooseneck built to any one of several conventional fifth wheel heights.

A further object is to provide a lift bed trailer of the foregoing type having a combined positive stop and locking mechanism for securing the lift bed in raised transport position, particularly when heavily loaded.

Another object of the invention is to provide a lift bed trailer of the above noted type wherein the lifting and locking mechanisms are protectively housed within a protected central area of the main frame and lift bed.

Still another object is to provide a lift bed trailer of the foregoing character having a plurality of axles and a suspension adapted to equalize the load on each axle.

Other objects and advantages will become apparent as the following description proceeds, taken together with the accompanying drawings, in which.

While the invention is susceptible of various modifications and alternative constructions, certain preferred embodiments have been shown in the drawings and will be described below in considerable detail. It should be understood, however, that there is no intention to limit the invention to the specific forms described but, on the contrary, the intention is to cover all modifications, alternative constructions and equivalents falling within the scope of the appended claims.

Figure 1:
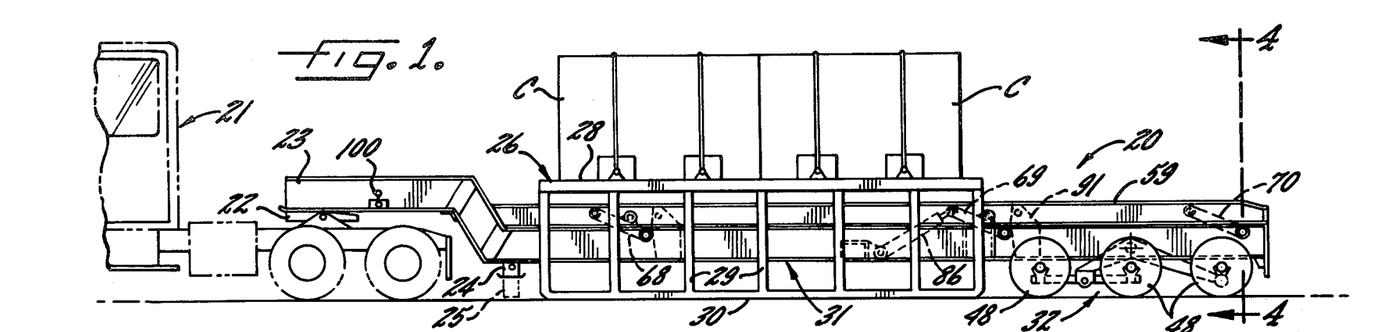
FIG. 1 is a side elevational view of an illustrative lift bed trailer exemplifying the present invention with the lift bed in lowered position and a loaded ground supported pallet straddling same.
Figures 2, 3:
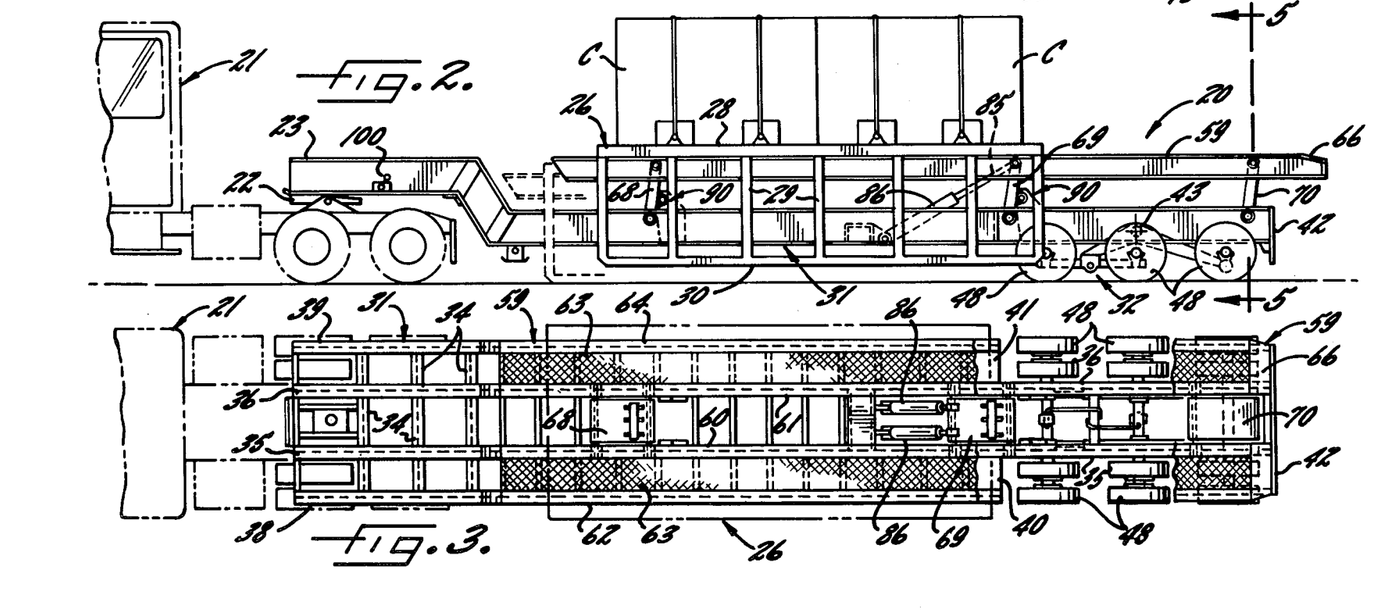
FIG. 2 is a side elevational view of the illustrative trailer with the lift bed in raised position holding the loaded pallet with its leg assembly clear of the ground for transport.
FIG. 3 is a plan view of the illustrative trailer as shown in FIG. 1 with the pallet frame indicated in dot-dash outline and a rearward portion of the lift bed broken away to facilitate illustration of the underlying structure.
Figure 4:
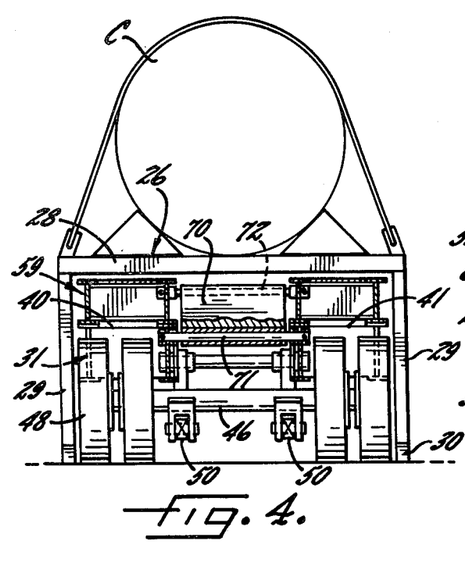
FIG. 4 is a transverse sectional view through the trailer taken in the plane of the line 4—4 in FIG. 1.
Figure 5:
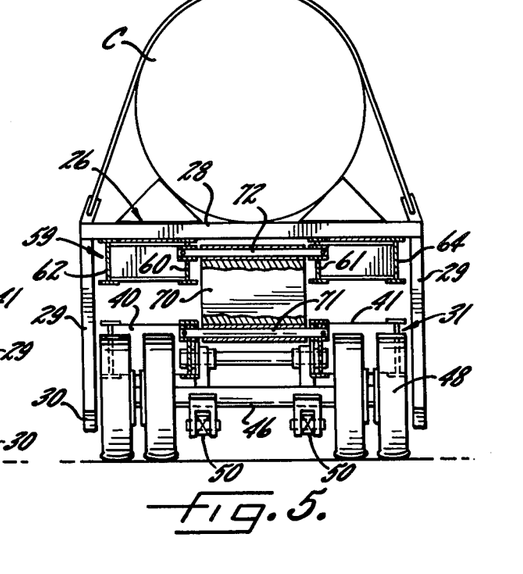
FIG. 5 is a transverse sectional view through the trailer taken in the plane of the line 5—5 in FIG. 2.

Referring more specifically to FIGS. 1 and 2, the invention is there exemplified in an illustrative heavy duty lift bed trailer 20 coupled to a tractor 21 by means of the usual fifth wheel connection. In this instance, the tractor fifth wheel 22 happens to have a conventional height of 48 inches above the ground which is sufficient to hold the trailer approximately level. Prior to coupling to the tractor, the trailer 20 is stored on landing legs 24 and landing leg blocks 25 which hold the lower face of the gooseneck 23 an inch or two less than 48 inches from the ground. The tractor is then coupled by backing it under the gooseneck. The inclined face of the fifth wheel 22 thereby exerts sufficient camming action to raise the gooseneck to 48 inches and permit the depending pin of the gooseneck to be engaged by the fifth wheel.

The trailer 20 (FIGS. 1, 2, 4 and 5) is adapted to transport loads through the use of one or more pallet frame units 26 each comprising a raised platform 28 with depending legs 29 terminating in a ground engaging skid 30. The pallet frame unit 26 may, for example, be loaded with two large steel coils C held in place as by means of appropriate chocks and tie down bands. The loaded unit 26 is adapted to straddle the trailer which freely moves under the platform 28 during loading. The trailer next raises the unit 26 and its load clear of the ground for transport to a destination. It then lowers the unit 26 until the skids 30 rest on the ground, whereupon the trailer freely moves out from under the platform 28 and is ready for another trip.

The trailer 20 comprises a relatively long main frame 31 of structural steel which may, for example, be approximately 48 feet in length. The frame 31 is supported at its forward end by the gooseneck 23 which engages the tractor fifth wheel 22, and at its rearward end by means of a multiple axle wheeled suspension 32. In this instance, the main frame 31 is a weldment comprising four laterally spaced, longitudinal stringers in the form of I-beams secured together by transverse struts 34 placed at intervals along their length. The two inside I-beams will be referred to as the inboard stringers 35, 36, while the two outside I-beams will be referred to as the outboard stringers 38, 39.

From the gooseneck 23 rearwardly to the suspension 32 (FIG. 3), the main frame is of uniform width which may, for example, be 87 inches. This major portion of the main frame contains all four I-beam stringers 35, 36, 38, 39. A short distance forward of the suspension 32, the two outboard stringers 38, 39 terminate and are connected to the inboard stringers by appropriate transverse end channels 40, 41. The two inboard stringers 35, 36 continue on and terminate at an end channel 42 at the rear of the trailer. The rearward extension of the main frame 31 defined by the inboard stringers and the end channel 42 connects with the suspension 32 and nests between the wheels on either side.

Figure 9:
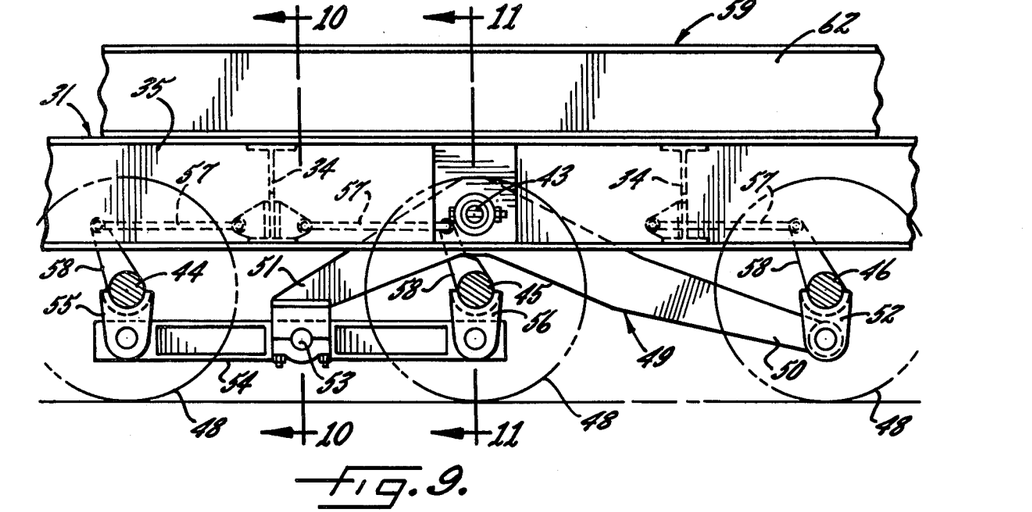
FIG. 9 is an enlarged fragmentary side elevational view of the trailer suspension structure with the wheels indicated in dot-dash outline.
Figure 10:
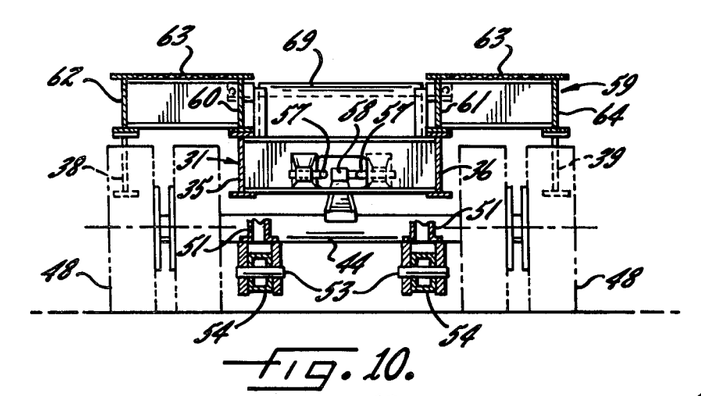
FIGS. 10 and 11 are transverse vertical sectional views taken respectively in the planes of the lines 10—10 and 11—11 in FIG. 9 to a slightly smaller scale.
Figure 11:
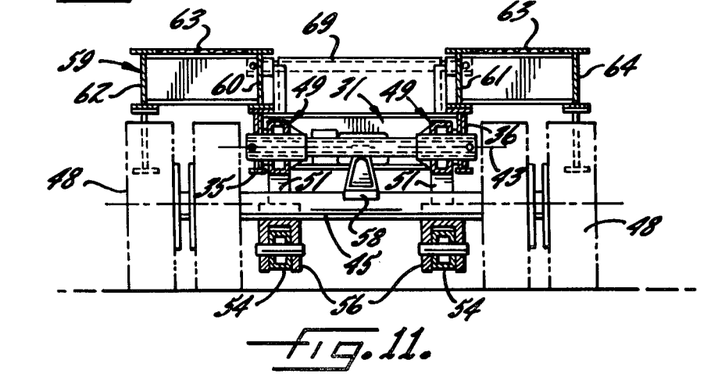
Figure 12:
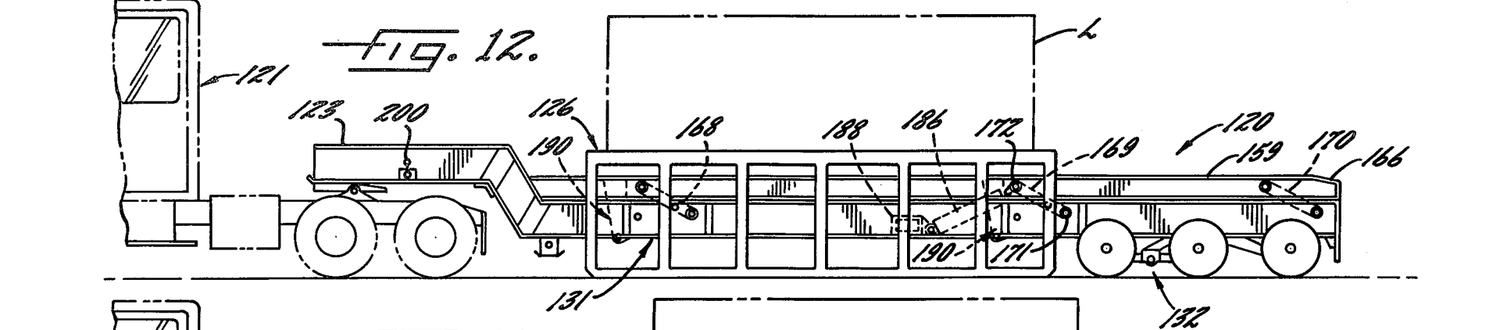
FIG. 12 is a side elevational view of another exemplary lift bed trailer similar to the one shown in FIG. 1 but having a modified form of stop and locking mechanism, said trailer also embodying the present invention.

In order to make certain that the exceptionally heavy load carried by the trailer 20 will be distributed equally on each axle of the suspension 32, the latter is attached to the main frame on a single transverse axis 43 passing through the rearwardly extended inboard frame stringers 35, 36 (FIGS. 9–11). In the present instance, the suspension 32 has three axles 44, 45, 46, each journaling a pair of large tie bars 49 spaced laterally from each other and journaled on the axis 43 just inside the inboard frame stringers 35, 36. Each tie bar 49 has the general form of an inverted "V" with its rearward arm 50 extending about twice the length of its forward arm 51. The rearward arm 50 is connected to the rearmost axle 46 as by means of an axle bracket 52 welded or otherwise fixed to the axle. The bracket 52 terminates in a clevis pivotally attached to the end of the rearward arm 50. The forward arm 51 of the tie bar terminates in a pivotal connection 53 with an equalizer bar 54. At its opposite ends, the equalizer bar 54 is pivotally attached to the respective clevises of axle brackets 55, 56, similar to the bracket 52, and welded or otherwise fixed to the forward and middle axles 44 and 45, respectively. By reason of this arrangement, the load on the suspension is spread equally on each of the three axles, thus enhancing chances of keeping each axle load within the legal limit.

To offset the reaction torque resulting from application of the trailer brakes, each of the axles is equipped with the customary torque rod 57 and torque rod bracket 58 (FIGS. 3 and 9). Each torque rod 57 is pivotally connected to its associated bracket 58 and to the main frame to accommodate the vertical floating movement of the axles.

If a different suspension were used and each of the axles were to be connected directly to the main frame, the axle loading would be unequal. In such event, the forward axle 44 would carry the greatest load due to the deflection characteristics of the main frame. In the case of a 60 ton load, for example, the load on the forward axle 44 could well exceed the legal limit.

A lift bed or lift frame 59 (FIGS. 1–6) is mounted in overlying relation with the main frame 31 and in the present instance its width corresponds to the maximum width of the main frame. The lift bed is also fashioned as a weldment which comprises four longitudinal stringers in the form of I-beams which may be of somewhat lesser depth than those of the main frame. The inside I-beams are the inboard stringers 60, 61 and the outside I-beams are the outboard stringers 62, 64. The I-beams of the bed are joined together at intervals by appropriate transverse members and the spaces in between are preferably filled in with expanded metal grating or other appropriate decking 63. The forward end 65 of the lift bed 59 is undercut at an appropriate angle to nest against the inclined portion of the gooseneck 23 when the lift bed is in its lowered position. The rearward end portion 66 of the lift bed is tapered downwardly and inwardly to facilitate entry of the trailer beneath a pallet frame unit 26 during a loading operation.

For the purpose of enabling the trailer 20 to transport heavily loaded pallets weighing, for example, something on the order of 60 tons, with the center of gravity of the load either in the central fore and aft plane of the trailer or laterally offset therefrom, a particularly rigid connecting means is provided between the main frame 31 and the lift bed 59 (FIGS. 4–8). This is accomplished by the use of a plurality of massive, box-like hinge panels 68, 69, 70 spanning the lateral distance between inboard stringers 35, 36 of the main frame and inboard stringers 60, 61 of the lift bed frame, except for close running clearances. Each hinge panel is journaled on a pair of heavy cross shafts 71, 72 connected between the inboard stringers of the main frame and the lift bed, respectively. In the present instance, the trailer 20 has three hinge panels but it should be noted that in some applications two would be sufficient. The cross shafts 71, 72 may, for example, have diameters on the order of $5\frac{1}{2}$ and $4\frac{1}{2}$ inches, respectively.

The forward hinge panel 68 and the rearward hinge panel 70 (FIGS. 1–5) are each fashioned as a unitary structure in the form of a generally flat box tapering slightly from its lower end toward its upper end. It is defined by a pair of spaced apart parallel bearing sleeves 74, 75, secured together by means of a pair of opposed end walls 76 and a pair of opposed side walls 78. The end walls 76 are formed of relatively heavy steel plate which may, for example, be about $1\frac{1}{4}$ inches thick. The side walls 78 are formed of somewhat thinner plate which may be on the order of $\frac{1}{2}$ inch thick reinforced with diagonal stiffener ribs 79, 80, on the inside. The bearing sleeve 74 at the lower end of the hinge panel is journaled on the cross shaft 71 connected between the inboard stringers of the main frame. The bearing sleeve 75 at the upper end of the hinge panel is journaled on the cross shaft 72 connected between the inboard stringers of the lift bed.

The central hinge panel 69 (FIGS. 1–3, 6–8) is similar in construction to each of the panels 68 and 70 but differs in the configuration of its upper end portion. The latter is formed with a pair of relatively large notches 82 between the upper bearing sleeve 81 and the end walls 84 of the hinge panel for accommodating the upper ends of the piston rods 85 of fluid actuators 86. The end walls 84 in this area are reinforced with an extra thickness of plate on their inner faces. Additional internal stiffener ribs 88 and 89 are situated on the inner faces of the side walls to afford additional strength in the vicinity of the actuator connections.

Figure 6:
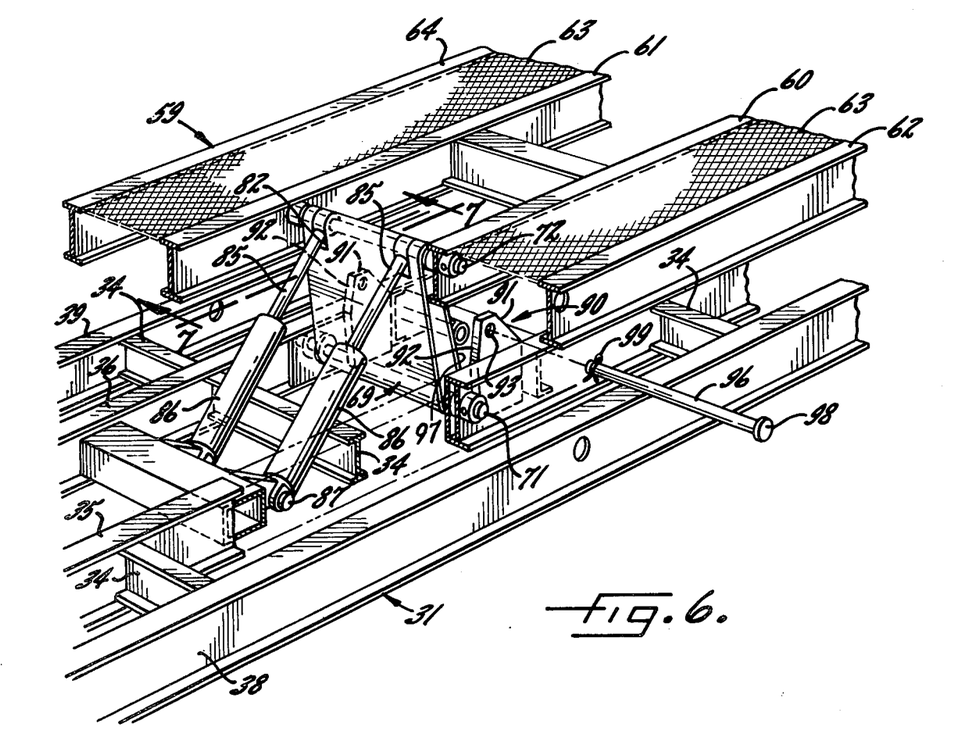
FIG. 6 is an enlarged, fragmentary perspective view of the structure of the central hinge panel, locking mechanism, and fluid actuator lifting mechanism, with the lift bed in partially raised condition.
Figure 7:
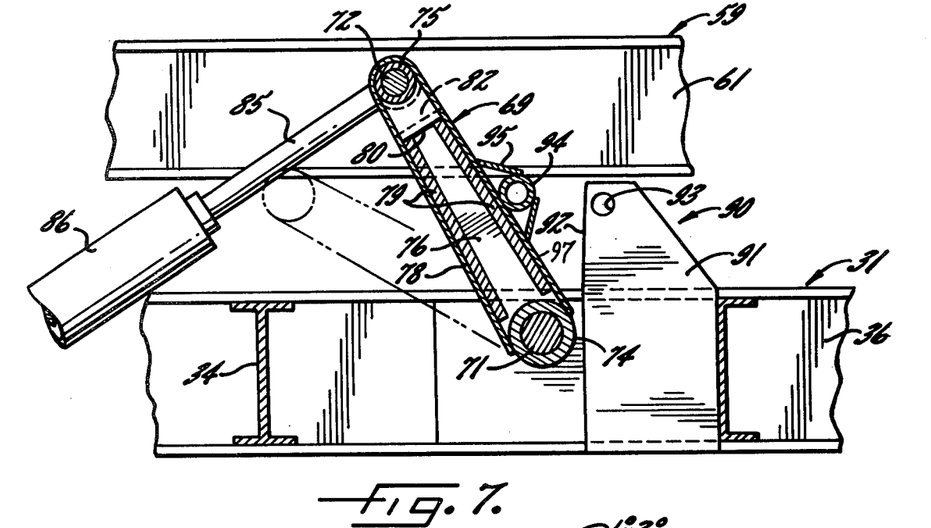
FIG. 7 is a further enlarged, fragmentary vertical sectional view taken in the fore and aft axial plane of the trailer as indicated by the line 7—7 in FIG. 6.
Figure 8:
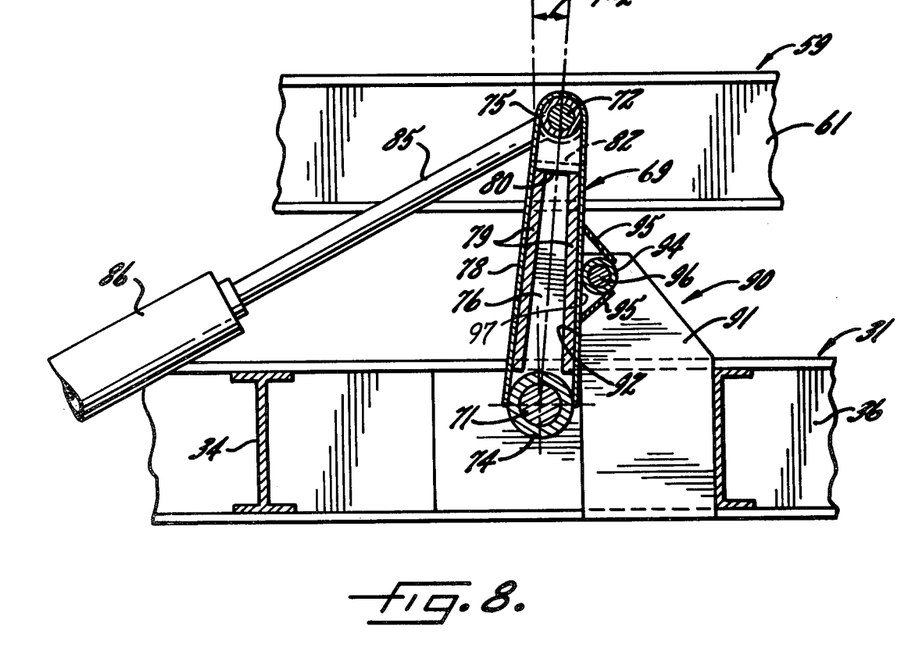
FIG. 8 is an enlarged vertical sectional view similar to FIG. 7 but showing the hinge panel and locking mechanism with the lift bed in fully raised and locked condition for transport.

For the purpose of safely arresting the motion of the power driven lift bed 59 and securely maintaining the lift bed in raised transport position, motion arresting locking mechanisms 90 are incorporated between the main frame 31 and one or more of the hinge panels 68, 69, 70 (FIGS. 6-8). In the present instance, such mechanisms are cooperatively associated with the forward and the central hinge panels 68, 69 (FIGS. 1-3).

Starting first with the motion arresting locking mechanism 90 associated with the central hinge panel 69, it will be noted that the mechanism 90 comprises a pair of spaced apart upstanding brackets 91 defining massive stop abutments 92 adapted to intercept relatively long, cooperating abutment areas 97 on the hinge panel 69. Relative arcuate movement of the stop abutments 92 and abutment areas 97 takes place about the axis of the cross shaft 71 and is terminated when the areas 92, 97 abuttingly engage each other.

The brackets 91 are formed from heavy plate stock fixed respectively to the inboard sides of the inboard stringers 35, 36 of the main frame. They extend vertically above the main frame and into the space between the inboard stringers 60, 61 of the lift bed. Each pair of brackets 91 is also formed with aligned circular locking apertures 93 which may be located adjacent its upper end. The hinge panel 69 has a tube 94 fixed transversely of its side wall adjacent the locking brackets. The tube 94 is welded or otherwise rigidly fixed in position and reinforced as by means of inclined gusset plates 95. The parts are so proportioned that when the hinge panel has moved through its top dead center position and slightly beyond by an angle on the order of about 1° to 2° from vertical as indicated in FIG. 8, the stop abutment areas 97 on the tapered side wall of the hinge panel 69 will be arrested by the stop abutments 92 on the brackets 91. This occurs despite the fact that the lift bed 69 is still being driven by the power lift members 86, the momentum of its own weight, and that of its load. At this point, the bore of the tube 94 will be aligned axially with the apertures 93 in the locking brackets. Transverse locking pin 96 with a shoulder 98 on one end and a retaining clip 99 on the other end may then be manually inserted through the aligned apertures 93 and the bore of the tube 94. This serves to lock the hinge panel 69, and thus the lift bed 59, positively in raised position and with no moment tending to urge the lift bed toward its lowered position.

To provide an appropriate factor of safety, a second motion arresting locking mechanism 90 identical to the one just described is mounted adjacent, and operatively associated with, the forward hinge panel 68 for engagement with stop abutment areas 97 on the panel 68. The second locking mechanism 90 is operated in unison with the first one and is adapted to receive a similar locking pin 96.

It will be appreciated from the foregoing that operation of the trailer 20 may be carried on in a simple, straightforward manner. Once coupled to the tractor 21, the trailer, with lift bed 59 lowered as shown in FIG. 1, may readily be backed under a heavily loaded pallet frame unit 26, the tapered rearward end portion 66 of the bed 59 facilitating entry under the pallet frame. With the trailer in approximately the position shown in FIG. 1, the lift bed may be raised by actuation of the fluid control lever 100 on the gooseneck which causes the piston rods of the fluid actuators 86 to extend. This, in turn, imposes a lifting thrust on the lift bed via the upper cross shaft 72 associated with the central hinge panel 69, raising the lift bed and the loaded pallet frame unit to transport position as indicated in FIG. 2. In this position, the stop abutment areas 97 of the forward and central hinge panels 68, 69 are in solid engagement with the stop abutments 92 of their respective motion arresting locking mechanisms 90 and their locking tubes are in precise alignment with the locking apertures of the brackets 91. In the present instance, the operator manually inserts the transverse locking pin 96 through the apertures and locking tube of each locking mechanism, the retaining clip on each locking pin serving to preclude its accidental withdrawal. The loaded trailer may then be transported to its destination and the foregoing sequence reversed to unlock the lift bed and loaded pallet, lower the latter to the ground, lower the lift bed until it rests upon the main frame as shown in FIG. 1, and drive the trailer out from under the loaded pallet.

It will be noted further that the configuration of the gooseneck 23 defines a flat deck space on its upper surface having a width equal to the maximum width of the main frame. This deck space may, if desired, be covered partially with expanded metal decking such as the decking 63 used on the lift bed. The gooseneck deck is particularly advantageous for certain in-plant operations in a steel mill. For example, the trailer may be loaded in the manner described above by backing it under two pallet frame units each loaded with steel plates stacked four to five inches above the pallet deck and then raising the lift bed and pallet units to transport position. With the trailer in this position, a steel plate as long as 60 feet may then be placed by appropriate overhead cranes on top of the loaded pallets with the forward end of the plate overhanging the gooseneck deck and the rearward portion of the plate overhanging the rearward end of the lift bed. The trailer thus loaded may then be driven to another destination in the plant and the 60 foot steel plate unloaded with the pallet units simply by lowering the lift bed and driving the trailer out from under the combined load including the 60 foot steel plate which remains on the pallet units.

The trailer 20 is also well adapted to handle eccentric loads, by which is meant loads having their center of gravity offset laterally from the fore and aft axial plane of the trailer. Such loads can occur in a number of ways as, for example, by stacking steel plate on a pallet unit so as to overhang on one side but not on the other. They can also occur as a result of loading irregularly shaped scrap metal on a pallet unit, or by loading a hopper on a pallet unit where the hopper is filled in a lopsided manner with heavy material such as grinding dust. When such loads occur, the trailer has sufficient strength and rigidity in the lift bed, main frame, and hinge panel connections to handle them effectively.

Turning now to FIGS. 12-20, the invention is there exemplified in modified form in an illustrative trailer 120. The major components of the trailer 120 are substantially identical with those of the trailer 20, the principal difference residing in the motion arresting locking means. The trailer 120 thus comprises a main frame 131 with a gooseneck 123 engagable with tractor 121. It includes a multiple axle suspension 132 like the one described earlier herein. The main frame 131 supports a lift bed frame 159 connected thereto by a plurality of massive hinge panels 168, 169 and 170. The lift bed 159 may be raised and lowered by power lift means in the form of hydraulic actuators 186 interposed between the main frame and the lift bed. Pallet frame unit 126, adapted to carry loads L well up to 60 tons, may be used with the trailer 120 in the manner previously described.

The main frame 131, like that of the trailer 20, is supported at its forward end by the gooseneck 123 which engages the tractor fifth wheel, and at its rearward end by means of the multiple axle wheeled suspension 132. Like the frame 31, the main frame 131 is a weldment comprising four laterally spaced, longitudinal stringers in the form of I-beams secured together by transverse struts placed at intervals along their length. The two inside I-beams will be referred to as the inboard stringers 135, 136, while the two outside I-beams will be referred to as the outboard stringers 138, 139.

The lift bed or lift frame 159, like that of the trailer 20, is mounted in overlying relation with the main frame 131 and its width corresponds to the maximum width of the main frame. The lift bed 159 is also fashioned as a weldment comprising four longitudinal stringers in the form of I-beams which may be of somewhat lesser depth than those of the main frame. The inside I-beams are the inboard stringers 60, 61 and the outside I-beams are the outboard stringers 62, 64. The I-beams of the bed are joined together at intervals by appropriate transverse members and the spaces in between are preferably filled in with expanded metal grating or other appropriate decking. The forward end of the lift bed 159 is adapted to nest against the inclined portion of the gooseneck 123 when the lift bed is in its lowered position. The rearward end portion 166 of the lift bed is tapered downwardly and inwardly to facilitate entry of the trailer beneath a pallet frame unit 126 during a loading operation.

The hinge panels 168, 169 and 170 (FIGS. 12–20) are of heavy, box-like construction and, except for close running clearances, span the lateral distance between the inboard stringers 135, 136 of the main frame and the inboard stringers 160, 161 of the lift bed frame. Like the hinge panels of the trailer 20, the hinge panels 168, 169 and 170 are journaled on respective pairs of massive cross shafts 171, 172 spanning the inboard stringers of the main frame and lift bed frame. The hinge panels are identical except for the middle panel 169 which is formed at its upper end with a pair of stubby crank arms 167. Each of the latter is pivotally connected to a clevis on the end of a respective actuator piston rod 185 (FIGS. 14, 16–18). The ends of the actuators opposite the piston rods 185 are pivotally connected to a box beam 188 rigidly fixed to the main frame inboard stringers 135, 136.

Provision is made in the trailer 120 for safely arresting the motion of the power driven lift bed 159 when elevated to transport position and for securely maintaining the lift bed in raised transport position. This is accomplished by use of motion arresting locking means 190 which in this instance is operatively associated with the forward hinge panel 168 and the middle hinge panel 169. Referring more specifically to FIGS. 16–20, it will be noted that the means 190 comprises a stop and locking buttress defined in part by a pair of relatively heavy plate type brackets 191 fixed in this instance in laterally spaced depending relation to the inside faces of the inboard stringers 160, 161 of lift bed frame 159. The brackets are spaced slightly forward of the upper ends of the respective hinge panels 168, 169 and have a running clearance with the inside faces of the inboard stringers 135, 136 of the main frame. The stop and locking buttress includes a relatively heavy structural channel 194 spanning and rigidly fixed to the brackets 191 as by welding.

Figure 18:
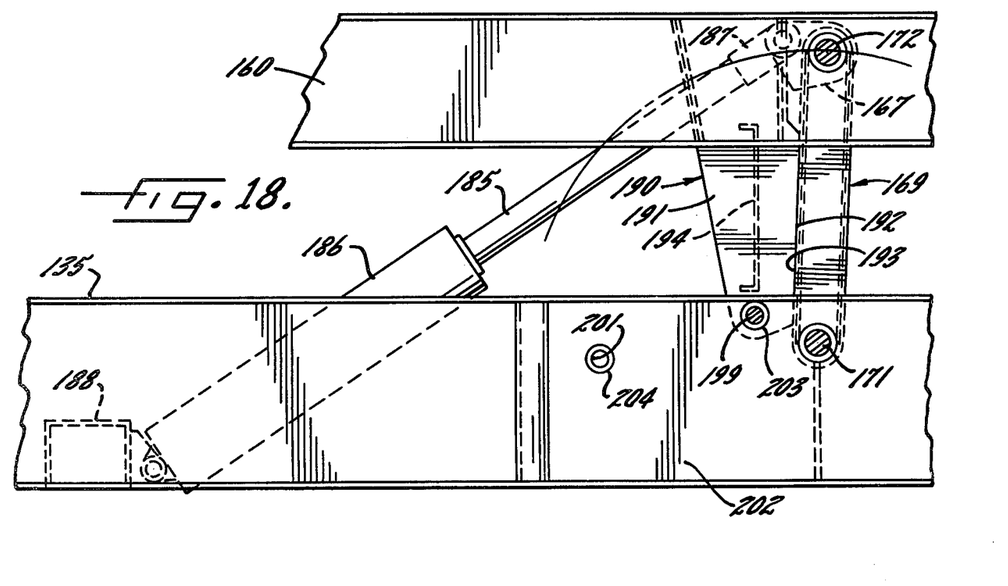
Figure 19:
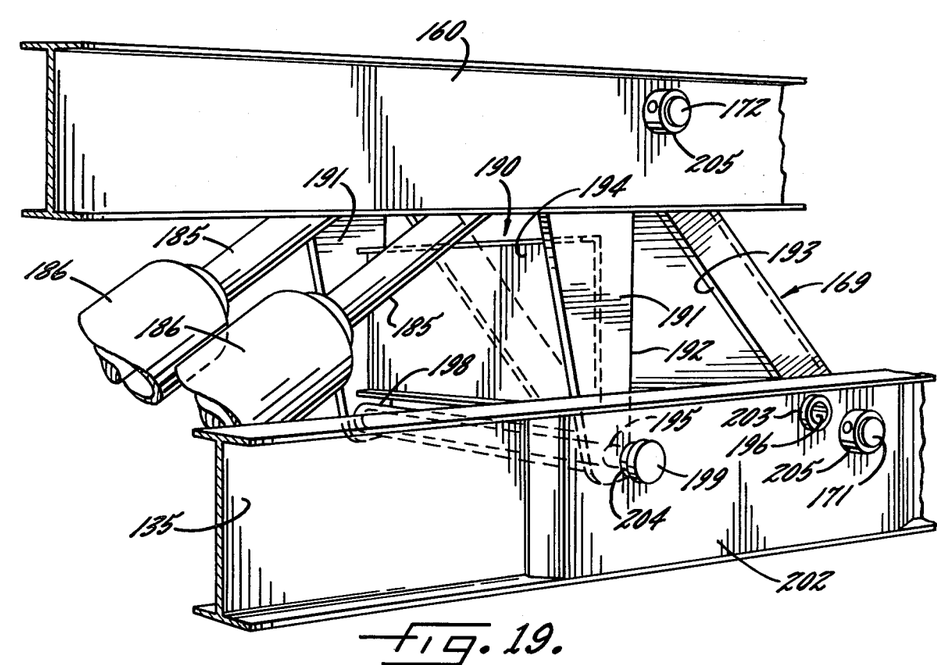
FIGS. 19 and 20 are enlarged, fragmentary perspective views illustrating the stop and locking mechanism of the trailer in the intermediate and the fully engaged positions, respectively.
Figure 20:
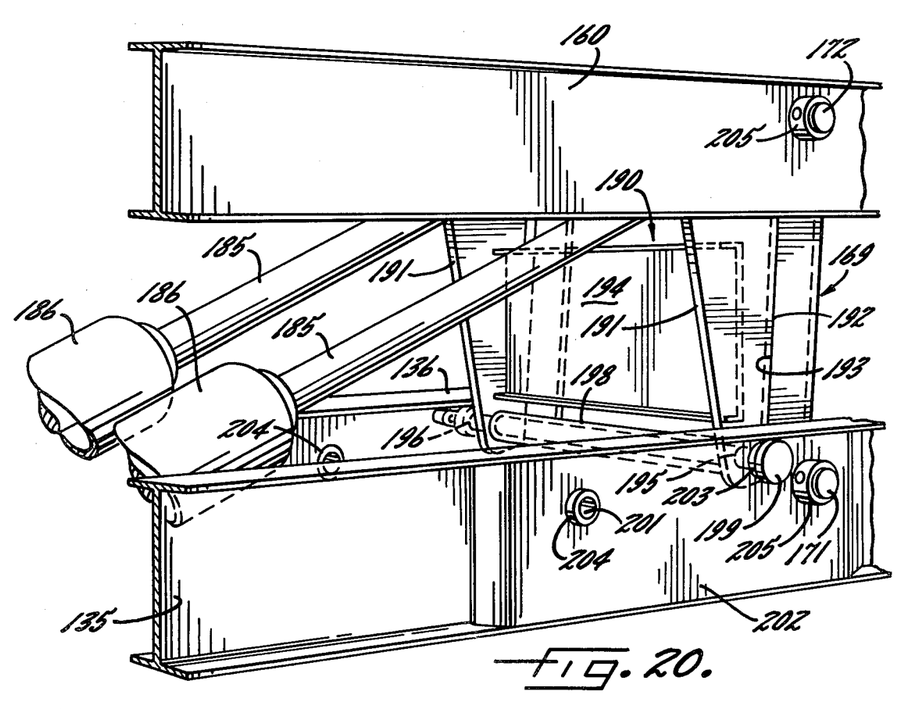

The rearward edges of the brackets 191 are formed so as to define massive stop abutments 192 adapted for cooperating engagement in response to relative arcuate movement with corresponding abutment areas 193 on the respective hinge panels 168, 169. The parts are so spaced and proportioned that the stop abutments 192 and 193 will engage to arrest the arcuate motion of the hinge panel, and thus the upward motion of the lift bed, when the hinge panel has moved slightly beyond its top dead center position by an angle on the order of 1° to 2° from vertical (FIGS. 18 and 20). This occurs notwithstanding the fact that the lift bed 159 is still being driven by power lift members 186 under fluid control valve 200, as well as the momentum of its own weight and any load it may be carrying.

Figure 13:
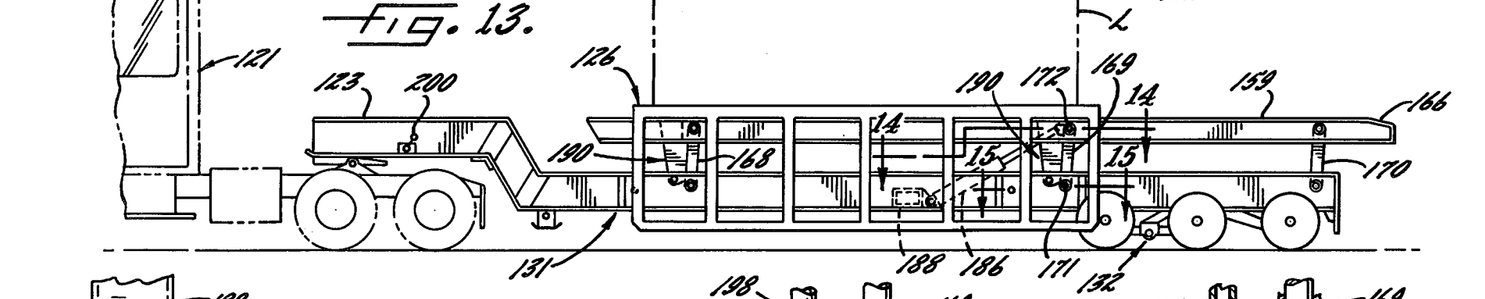
FIG. 13 is a side elevational view of the trailer of FIG. 12 but with the lift bed in the raised transport position and a load carrying pallet frame unit mounted thereon, the stop and locking mechanism being in the fully engaged position.

For the purpose of locking the lift bed 159 in the raised transport position shown in FIGS. 13, 18 and 20, each pair of the brackets 191 is formed with aligned locking apertures 195 concentric with tubular reinforcing strut 198 (FIGS. 16–20) fixed between the lower end portions of the brackets 191. The lower end portions of the brackets containing the locking apertures 195 overlap the main frame inboard stringers when the lift bed frame is in raised transport position. The inboard stringers 135, 136 of the main frame are provided with aligned pairs of locking apertures 196 adjacent each hinge panel 168, 169 and adapted to register with the locking apertures 195 when the stop abutments 192, 193 are fully engaged as shown in FIGS. 13, 18 and 20. The lift bed may then be positively retained in this position without assistance from the power lift members 186 by insertion of locking pin 199. The latter may be releasably secured in engaged position in any suitable manner.

In order to facilitate use of the trailer 120 under conditions where increased stability is necessary or desirable due to uneven terrain, or where lower head clearance is needed, provision is made for locking the lift bed in an intermediate or partially raised position. The arrangement is such that the pallet frame skids will still be supported clear of the ground. This is accomplished by forming a second pair of aligned locking apertures 201 in the inboard stringers 135, 138 of the main frame spaced from the apertures 196 and situated on the arcuate travel path of the bracket apertures 195 between raised transport position and fully lowered position. By slow and careful jogging operation of the lift control lever 200, the bracket aperture 195 can be brought into alignment with the main frame stringer apertures 196 and the locking pin 199 inserted therethrough.

To accommodate the reaction loads due to raising the lift bed and engaging the motion arresting locking mechanisms 190, the main frame inboard stringers 135, 136 are reinforced in the region of the hinge panel cross shafts 171 and the locking apertures 196 (FIGS. 12–20). This is achieved by fixing auxiliary webs 202 to the outer edge portions of the upper and lower flanges of the stringers 135, 136. The apertures 196, 201 are defined by reinforcing sleeves 203, 204 rigidly fixed in the auxiliary webs 202 and the main web of the inboard stringers (FIGS. 15–20). Similarly, the lower cross shafts 171 of the hinge panels 168, 169 are journaled in bearing sleeves 207 fixed in the webs 202 and main web of the inboard stringers. The shafts 171 are retained by collars 205 fixed thereto outboard of the bearing sleeves.

Figure 14:
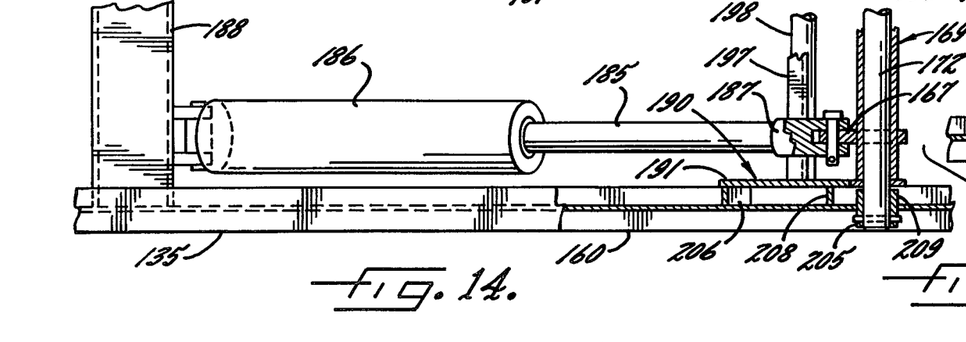
FIG. 14 is an enlarged fragmentary sectional view showing one of the power lift actuators and a section through a part of the stop and locking mechanism, such view being taken in the plane of the line 14—14 in FIG. 13.
Figure 15:
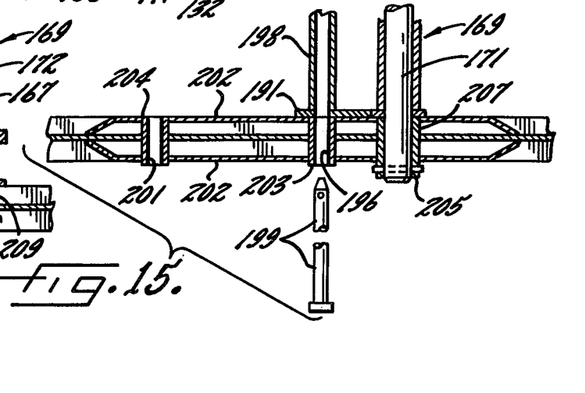
FIG. 15 is an enlarged fragmentary sectional view through a portion of the main frame and a portion of the stop and locking mechanism, taken in the plane of the line 15—15 in FIG. 13.
Figure 16:
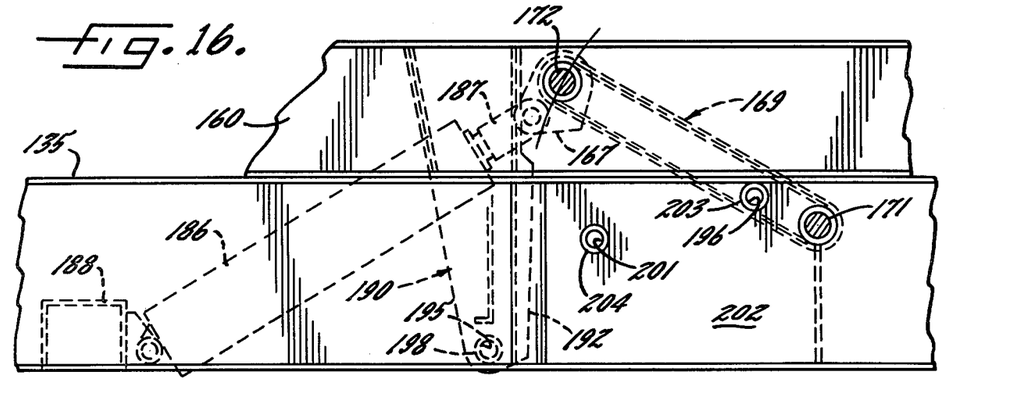
FIGS. 16, 17 and 18 are enlarged fragmentary elevational views, partly in section, illustrating the disengaged, intermediate, and fully engaged positions, respectively, of the stop and locking mechanism incorporated in the trailer of FIG. 12.
Figure 17:
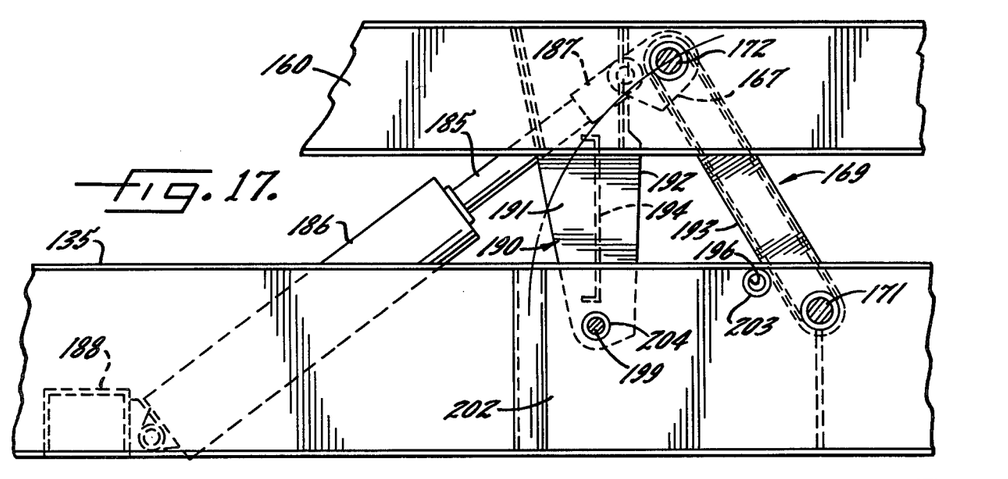

The lift bed inboard stringers 135, 136 are also reinforced in the region of the upper hinge panel cross shafts 172 ahd locking means 190 by stiffener ribs 206, 208 and bearing sleeve 209. The latter is fixed in the main web of the stringer as by welding (FIG. 14).

I claim as my invention:

1. A heavy duty lift bed trailer adapted for use with a tractor having a fifth wheel connection, said trailer comprising, in combination,
   (a) a main frame having a pair of laterally spaced inboard longitudinal stringers and a pair of laterally spaced outboard longitudinal stringers disposed in straddling relation with the latter;
   (b) a gooseneck at said forward end adapted for engagement with the fifth wheel of the tractor;
   (c) a multiple axle wheeled suspension situated adjacent said rearward end;
   (d) a lift bed mounted on said main frame in overlying relation with same and having a pair of laterally spaced inboard longitudinal stringers;
   (e) said lift bed inboard stringers overlying said inboard stringers of said main frame;
   (f) power lift means interposed between said main frame and said lift bed for raising and lowering the latter;
   (g) a plurality of hinge panels spanning the space between said inboard longitudinal stringers of said main frame and said lift bed;
   (h) a first cross shaft connected to and extending transversely between said inboard stringers of said main frame; said first cross shaft passing through the lower end portion of each said hinge panel;
   (i) a second cross shaft connected to and extending transversely between said inboard stringers of said lift bed; said second cross shaft passing through the upper end portion of each said hinge panel; and
   (j) each said hinge panel being provided with a lower bearing sleeve journaled on said first cross shaft and an upper bearing sleeve journaled on said second cross shaft.

2. In a heavy duty lift bed trailer for use with a tractor vehicle, the combination comprising;
   (a) a main frame having a pair of laterally spaced inboard longitudinal stringers;
   (b) a lift bed frame having a pair of laterally spaced inboard longitudinal stringers overlying those of said main frame;
   (c) a plurality of hinge panels interposed between said laterally spaced longitudinal stringers of said main frame and said lift bed frame, said hinge panels being pivotally connected between said main frame and said lift bed frame for constraining the latter to move in parallel relation to said main frame;
   (d) each said hinge panel being disposed to pivot between a lowered position defined by engagement of said lift bed with said main frame, and a raised transport position with said hinge panel slightly past vertical dead center; and
   (e) motion arresting locking means fixed to one of said frames and defining relatively long positive stop abutments adapted to coact with complementary stop abutment areas on one said hinge panel in response to relative arcuate movement between said motion arresting locking means and said one hinge panel, said coaction defining said raised transport position and locking said lift bed frame in said position.

3. In a heavy duty lift bed trailer for use with a tractor vehicle, the combination comprising:
   (a) a main frame having a pair of laterally spaced inboard longitudinal stringers;
   (b) a lift bed having a pair of laterally spaced inboard longitudinal stringers overlying those of said main frame;
   (c) a plurality of hinge panels pivotally connected between said main frame and said lift bed for constraining the latter to move in parallel relation to said frame between a lowered loading position and a raised transport position;
   (d) motion arresting locking means comprising brackets fixed respectively to the inboard sides of said main frame inboard stringers adjacent one said hinge panel;
   (e) said motion arresting locking means including relatively long stop abutments defined by a flat area on each said bracket and disposed in position to intercept coacting stop abutment areas on said one hinge panel to thereby define an upper limit position slightly past dead center when said lift bed is in said raised transport position; and
   (f) said motion arresting locking means also including means for securing said lift bed and said hinge panel in raised transport position.

4. In a heavy duty lift bed trailer for use with a tractor vehicle, the combination comprising:
   (a) a main frame having a pair of laterally spaced inboard longitudinal stringers;
   (b) a lift bed having a pair of laterally spaced inboard longitudinal stringers overlying those of said main frame;
   (c) a plurality of hinge panels pivotally connected between said main frame and said lift bed for constraining the latter to move in parallel relation to said frame between a lowered loading position and a raised transport position;
   (d) a pair of spaced apart locking brackets fixed respectively to the inboard sides of said main frame inboard stringers adjacent one said hinge panel;
   (e) a motion arresting stop abutment defined on the edge portion of each said locking bracket and disposed in position to intercept corresponding stop abutments adjacent the edges of said one hinge panel in an upper limit position slightly past dead center when said lift bed is in said raised transport position;
   (f) means defining a first locking aperture in each said locking bracket;
   (g) means defining a second locking aperture in said one hinge panel; and
   (h) a locking pin separate from said stop abutments and adapted to engage said first and second apertures for positively securing said lift bed and said one hinge panel in raised transport position.

5. In a heavy duty lift bed trailer for use with a tractor vehicle, the combination comprising:
   (a) a main frame having a pair of laterally spaced inboard longitudinal stringers;
   (b) a lift bed having a pair of laterally spaced inboard longitudinal stringers overlying those of said main frame;
   (c) a plurality of hinge panels pivotally connected between said main frame and said lift bed for constraining the latter to move in parallel relation to said frame between a lowered loading position and a raised transport position;

(d) a pair of spaced apart locking brackets fixed respectively to the inboard sides of said main frame inboard stringers adjacent one said hinge panel;

(e) a relatively long stop abutment defined on the edge of each said locking bracket and disposed in position to intercept corresponding abutment areas on said one hinge panel in an upper limit position when said lift bed is in said raised transport position;

(f) means defining a first locking aperture in each said locking bracket;

(g) a tubular member fixed to the side wall of said one hinge panel transversely thereof, said tubular member defining a second locking aperture adapted to register with said first locking apertures when said hinge panel engages said locking bracket stop abutments; and (h) a locking pin adapted to engage said first and second apertures for positively securing said one hinge panel and said stop abutments n engagement so as to maintain said lift bed and said one hinge panel in raised transport position.

6. In a heavy duty lift bed trailer for use with a tractor vehicle, the combination comprising:

(a) a main frame having a pair of laterally spaced inboard longitudinal stringers;

(b) a lift bed having a pair of laterally spaced inboard longitudinal stringers overlying those of said main frame;

(c) a plurality of hinge panels pivotally connected between said main frame and said lift bed for constraining the latter to move in parallel relation to said frame between a lowered loading position and a raised transport position;

(d) a first cross shaft extending between said inboard stringers of said main frame and through the lower end portion of one said hinge panel;

(e) a second cross shaft extending between said inboard stringers of said lift bed and through the upper end portion of said one hinge panel;

(f) a third cross shaft extending between said inboard stringers of said main frame and spaced from said first cross shaft;

(g) a pair of laterally spaced fluid actuators pivotally connected respectively between said third cross shaft and said second cross shaft;

(h) a pair of spaced apart locking brackets fixed respectively to the inboard sides of said main frame inboard stringers adjacent said one hinge panel;

(i) a stop abutment on each said locking bracket disposed in position to intercept said one hinge panel in an upper limit position slightly past dead center when said lift bed is in said raised transport position;

(j) means defining a first locking aperture in each said locking bracket;

(k) means defining a second locking aperture in said one hinge panel; and (l) a locking pin separate from said stop abutments adapted to engage said first and second apertures for positively securing said lift bed and said one hinge panel in raised transport position.

7. In a heavy duty lift bed trailer for use with a tractor vehicle, the combination comprising:

(a) a main frame having a pair of laterally spaced inboard longitudinal stringers;

(b) a lift bed having a pair of laterally spaced inboard longitudinal stringers overlying those of said main frame;

(c) a plurality of hinge panels pivotally connected between said main frame and said lift bed for constraining the latter to move in parallel relation to said frame between a lowered loading position and a raised transport position;

(d) a pair of spaced apart locking brackets fixed respectively to the inboard sides of said lift bed frame inboard stringers adjacent one said hinge panel;

(e) a relatively long stop abutment defined in the edge of each said locking bracket and disposed in position to intercept corresponding abutment areas on said one hinge panel in an upper limit position when said lift bed is in said raised transport position;

(f) means defining aligned locking apertures in each said locking bracket;

(g) means defining aligned locking apertures in each said main frame inboard stringer adjacent said hinge panel; and (h) a locking pin adapted to engage said aligned locking apertures of said locking brackets and said main frame stringers for positively securing said one hinge panel and said stop abutments in engagement so as to maintain said lift bed and said one hinge panel in raised transport position.

8. The combination set forth in claim 7, wherein at least two said hinge panels are operatively associated with respective pairs of locking brackets and stop abutments, and respective pairs of locking apertures in said locking brackets and said main frame inboard stringers.

9. In a heavy duty lift bed trailer for use with a tractor vehicle, the combination comprising:

(a) a main frame having a pair of laterally spaced inboard longitudinal stringers;

(b) a lift bed frame having a pair of laterally spaced inboard longitudinal stringers overlying those of said main frame;

(c) a plurality of hinge panels interposed between said laterally spaced longitudinal stringers of said main frame and said lift bed frame, said hinge panels being pivotally connected between said main frame and said lift bed frame for constraining the latter to move in parallel relation to said main frame;

(d) each said hinge panel being disposed to pivot between a lowered position defined by engagement of said lift bed with said main frame, an intermediate or partially raised position, and a raised transport position slightly past vertical dead center;

(e) power lift means interposed between said main frame and said lift bed frame for raising and lowering said lift bed frame;

(f) a motion arresting locking means mounted on one of said frames and comprising a pair of laterally spaced brackets fixed to said frame adjacent a respective one of said hinge panels, said brackets being adapted for cooperating engagement with said one of said hinge panels in response to relative arcuate movement between the latter and said brackets;

(g) said brackets having projecting end portions overlapping the other one of said frames; and (h) means on said projecting end portions of said brackets and on said other one of said frames for positively coupling same together when said lift bed is in said partially raised position and when said lift bed is in said raised transport position with said brackets engaged with said one hinge panel.

10. In a heavy duty lift bed trailer for use with a tractor vehicle, the combination comprising:
   (a) a main frame having a pair of laterally spaced inboard longitudinal stringers;
   (b) a lift bed frame having a pair of laterally spaced inboard longitudinal stringers overlying those of said main frame;
   (c) a plurality of hinge panels interposed between said laterally spaced longitudinal stringers of said main frame and said lift bed frame, said hinge panels being pivotally connected between said main frame and said lift bed frame for constraining the latter to move in parallel relation to said main frame;
   (d) each said hinge panel being disposed to pivot between a lowered position defined by engagement of said lift bed with said main frame, and a raised transport position slightly past vertical dead center;
   (e) power lift means for raising and lowering said lift bed frame;
   (f) a motion arresting locking means mounted on said lift bed frame and adapted for cooperating engagement with one of said hinge panels;
   (g) said motion arresting locking means including means defining aligned pairs of locking apertures in said main frame inboard stringers; and
   (h) said motion arresting locking means further including a pair of laterally spaced locking brackets spanned by transverse reinforcing struts and defining relatively long stop abutments engageable with complementary abutment areas on said one hinge panel, said brackets having an aligned pair of locking apertures registrable with selected pairs of said main frame stringer locking apertures, and a locking pin for engaging said locking apertures when in registration.

11. The combination set forth in claim 10, including a plurality of said motion arresting locking means each operatively associated with a respective one of said hinge panels.

* * * * *